Figure 1:
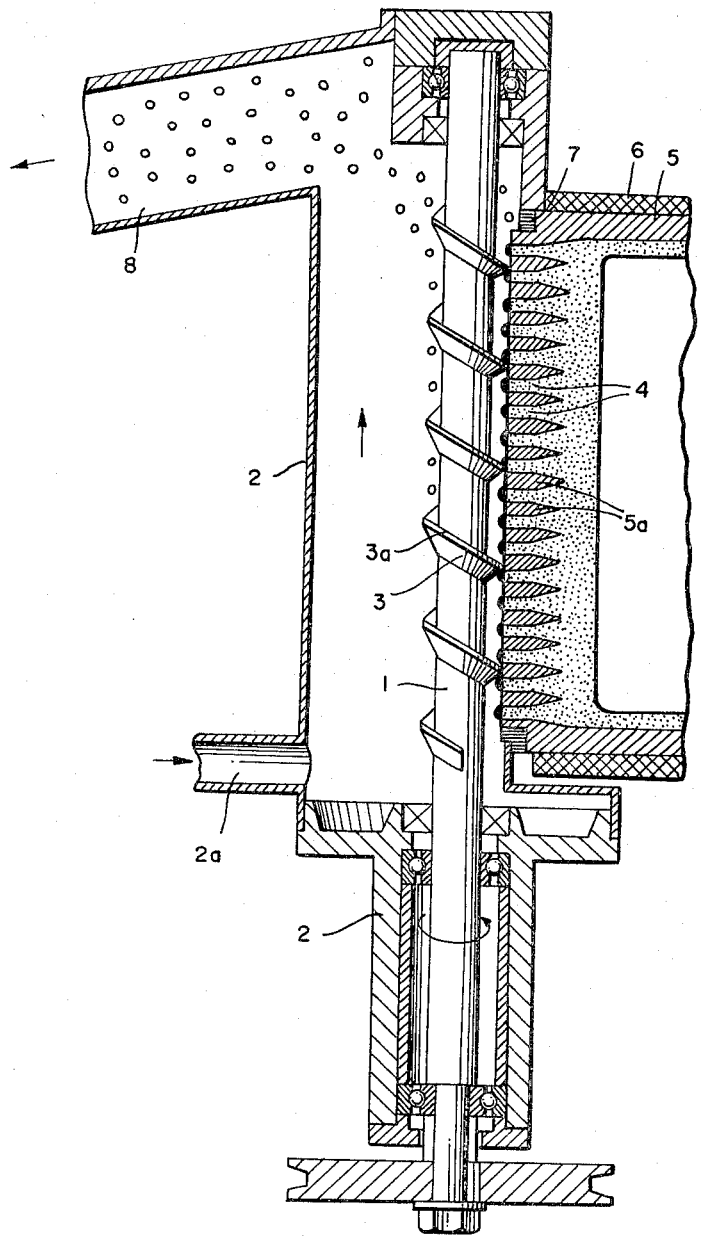

May 2, 1967 A. RETTIG 3,316,590
GRANULATING APPARATUS, PARTICULARLY FOR THERMOPLASTICS
Filed April 28, 1965 2 Sheets-Sheet 2

INVENTOR:
AUGUST RETTIG
BY
Marzall, Johnston, Cook & Root
ATT'YS

United States Patent Office 3,316,590
Patented May 2, 1967

3,316,590
GRANULATING APPARATUS, PARTICULARLY FOR THERMOPLASTICS
August Rettig, Ludwigshafen (Rhine), Germany, assignor to Badische Anilin- & Soda-Fabrik Aktiengesellschaft, Ludwigshafen (Rhine), Germany
Filed Apr. 28, 1965, Ser. No. 451,591
Claims priority, application Germany, Apr. 29, 1964, B 76,577
6 Claims. (Cl. 18—12)

This invention relates in general to granulating methods for thermoplastics and appropriate apparatus therefore, and it relates particularly to a helically coiled cutting member having a continuous cutting edge arranged in front of the die plate of the extrusion device which may act at the same time as conveying means for a limited liquid coolant stream.

In synthesis, plastics are usually obtained in a form which makes necessary a further treatment, known as preparation, prior to subsequent processing. In general, the plastics crude material obtained in the form of powdered, flocculent or ground material or formless melts is forced by conveying and kneading machines through nozzles, if desired cooled and reduced to granulate (apart from coloring and mixing with other materials). Cooling and granulating, to avoid resupplying heat, are frequently carried out immediately at the point of discharge of the conveying and kneading machine where die plates having many extrusion orifices are arranged at which the extruded threads are cut into granulate and only then cooled. This lastmentioned method is known as face cutting.

A face cutting method for the production of granulate from thermoplastics is already known in which the threads of plastic are forced immediately from the extrusion orifices into a cooling liquid and cut transversely immediately at the extrusion orifices while immersed in the liquid before they have cooled throughout to such an extent that they are solid.

Apparatus for carrying out this method are designed so that a stream of cooling liquid is supplied continuously into the region of the axis of the cutting means and the liquid is thrown outwardly and led away by the rotation of the cutting means. Agglomeration of the grains of granulate is effectively prevented by this method and corresponding apparatus, but the heat of the granulate is given off so intensely by reason of the complete immersion in the liquid coolant, that the residual heat is usually insufficient for drying the granulate and therefore subsequent drying is necessary. Furthermore, apparatus of the said type occupy a very large space.

Face cutting apparatus are also known having propeller-shaped cutting blades rotating in front of the die plate and usually mounted on a flying shaft, which move in a spray-moist atmosphere formed by means of the cooling liquid. The granulate dips into a limited stream of liquid coolant which may be adjustable as regards the lengths of the cooling zone and which is located beneath the granulation point, the granulate being carried along by the liquid stream to a sieve of suitable mesh width and then discharged. The lastmentioned prior art apparatus are limited in their cutting capacity and in other respects operate at a very high noise level. Since furthermore the individual die openings are at different distances from the axis of rotation of the rotating granulating blade they unavoidably give a granulate which to a certain extent is irregular.

The invention therefore has for its object to provide an efficient granulating means having improved uniformity of cut, in which agglomeration of the granulate is prevented by an extremely limited stream of liquid coolant and which further permits the use for transportation of the granulate of a gaseous and liquid coolant either together or individually side by side. Another object of the invention is to provide a granulating means having a low noise level.

The objects of the invention are achieved by an apparatus in which the die and/or the orifices of the dies in a die plate are arranged linearly and the cutting tool mounted rotatably straight in front of the same is designed as a roller-shaped member having projecting from the surface of the roller a ridge spirally wound thereon and having a cutting edge on its outside.

According to a further feature of the invention, the spiral ridge having an outer cutting edge is undercut or hollow-ground and with limited immersion into a cooling liquid serves to convey a thread of liquid coolant over the points of cutting on the die plate.

The abovementioned design of cutting tool also makes possible the provision in accordance with the invention of a plurality of roller-shaped cutting tools parallel to one another on one extrusion apparatus to increase the quantitative cutting capacity.

Other features of the invention will become evident from the following description given with reference to the accompanying drawings.

FIGURE 1 shows diagrammatically a horizontal section through an apparatus having the most essential features of the invention. The roller-shaped cutting tool 1 is driven from one end and mounted at both ends in a housing 2. Contrasted with the prior arts propeller-shaped granulating blades mounted on a flying shaft, a particularly quiet running is achieved even at a high cutting rate. The cutting edge 3a is on the outside of a ridge 3 spirally wound around the cutting tool member 1. The front edge of the ridge 3 is preferably undercut or hollow-ground. The cutting edge 3a thus stands out in the direction of cutting and conveyance with respect to the root line of the ridge profile on the surface of the roller. This provides an increased conveying action for the granulate cut off and for any liquid coolant without appreciable additional expenditure. The cutting tool 1 lies straight in front of linearly arranged die orifices 4 in a die plate 5a of the die head 5 of an extrusion apparatus (not shown), preferably a screw extruder. The die head 5 is capable of being heated in the conventional way by means of externally applied heating tapes 6. It is also thermally insulated from the cooled housing 2 by a ceramic plate 7. A stream of coolant enters through a pipe 2a into the housing 2. The granulate is discharged through channel 8 in the said stream of coolant.

The front face of the die plate 5a has a curvature corresponding to the circular outline of the cutting edge 3a which accordingly is also followed by the openings of the die orifices 4 on which the shear force acts. The cutting edge 3a shears off smoothly the plastic string or thread issuing from each die orifice and the spiral ridge immediately exerts a positive conveying action on the cut off granulate grains behind the cutting position. The lead of the spiral ridge 3 with the outer cutting edge 3a and the pitch of the linearly arranged die orifices 4 in the die plate 5a are correlated to each other so that upon one rotation of the roller-shaped cutting tool 1 about 360°, the same cutting surface sizes occur and uniform shearing forces are applied. A constant torsional moment thus results at the driving side of the cutting tool 1 for a 360° angular path.

To prepare very fine granulates which render particularly high cutting speeds necessary at the mouth of the die orifices 4, the roller-shaped cutting tool 1 may have two or more spiral ridges 3 having an outer cutting edge 3a. The cutting tool 1 is preferably made cylindrical, but if desired it may also be slightly conicial if an unsymmetrical distribution of the linearly arranged die orifices 4 in the die plate 5a is desired in any particular case. The cutting tool 1 may be simply and accurately made, quickly exchanged and reground at the cutting edge 3a without special equipment.

Figure 2:
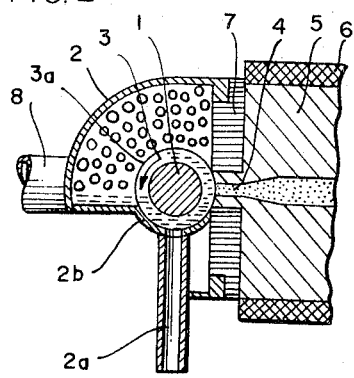
Figure 3:
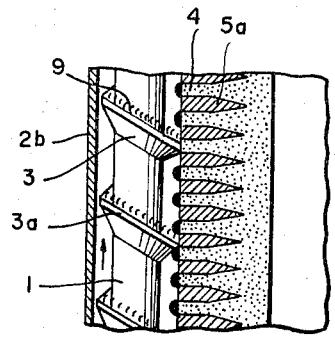

FIGURES 2 and 3, while retaining all the essential features of the invention, illustrate another embodiment in which the conveying action of the undercut or hollow-ground ridge 3 is utilized for carrying a limited small stream of liquid coolant to all the cutting points. The housing 2 which surrounds the roller shaped cutting tool 1 (as may be seen in the cross-section in FIGURE 2) is brought beneath the cutting tool 1 into close proximity to the circular outline of the cutting edge 3 and forms a channel 2b which is filled with coolant liquid at least to the height of the ridge 3. When the cutting tool 1 rotates in the direction indicated by an arrow in FIGURE 2, a thread of liquid 9 is continually carried in the hollow-ground front edge of the ridge 3 over the cutting points at the mouth of the die orifices 4 (see FIGURE 3). To keep the cross-section of this thread of liquid (which is one of the factors determining the cooling effect) as uniform as possible and not to allow breaks to occur therein, the speed of rotation of the cutting tool should be correlated with the hollow shape and diameter of the ridge 3 and with the surface tension of the coolant liquid used. The coolant liquid which is conveyed by the ridge 3 through the channel 2b is advantageously recycled and recooled in a heat exchanger outside the apparatus. As also shown in FIGURE 2, the housing 2 with the liquid-filled channel 2b situated immediately beneath the cutting tool 1 may be so designed that the liquid coolant may be used jointly with a gaseous coolant.

A number of further embodiments are possible within the scope of the invention to increase the cutting capacity of the apparatus.

Figure 4:
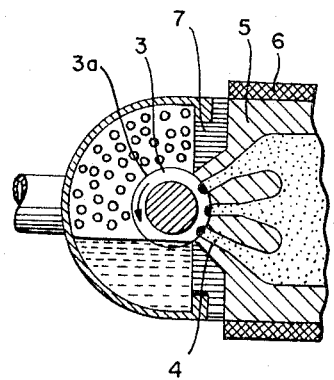

FIGURE 4 shows a diagrammatic cross-section through an apparatus in which the die plate 5a of the die head 5 has a plurality of die orifices 4 in a plane perpendicular to the axis of the roller shaped cutting tool 1. The number of die orifices to be swept by one cutting tool roller, while exerting shear forces, will in general depend (for otherwise the same granulate cut) on the conveying power of the extrusion apparatus, the driving power of the granulation apparatus with a cutting capacity increased in the said manner being adapted to the torsional moment required for the cutting tool. The embodiment having a plurality of die orifices 4 in a plane perpendicular to the axis of the cutting tool may also comprise making a liquid coolant, which is entrained as a continuous current in the hollow-ground portion of the ridge 3 in the direction of cutting, impinge partially on the die plate.

Figure 5:
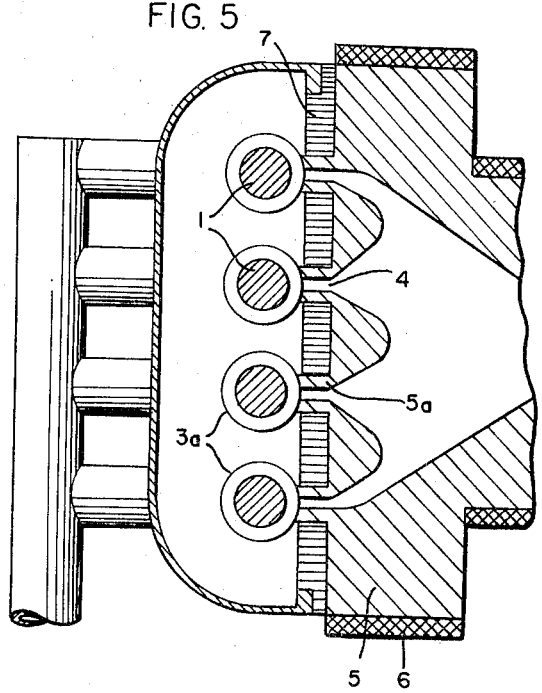

FIGURE 5 shows an arrangement having a plurality of parallel roller-shaped cutting tools 1 which may have a common drive. In this case a number of branch channels for the plastic composition equal in number to the number of cutting tools 1 is provided in the extrusion apparatus, these channels terminating at the die plate 5a in a number of rows of linearly arranged die orifices 4. The last mentioned arrangement, with a plurality of cutting tools 1 arranged parallel to each other, may also be carried out in such a way that the ridges 3 having outer cutting edges 3a engage in each other, i.e., dovetail.

For all the abovementioned embodiments, depending on the particular properties of the plastic or thermoplastic substance to be processed into granulate, stripping elements may be provided which engage like fingers in the gaps between the ridges 3 having outer cutting edges 3a.

I claim:
1. Granulating apparatus for thermoplastics which comprises an extrusion device having a die plate with a plurality of extrusion orifices therein, said orifices being arranged in at least one straight line, and at least one rotatable cutting tool having a spiral, outer, cutting edge contacting the outer face of said die plate at spaced points along said line of orifices whereby said spiral cutting edge shears threads or strings of thermoplastic extruded through said orifices as said cutting tool rotates.

2. Apparatus as claimed in claim 1, said cutting tool comprising a rotatable cylinder having a spiral ridge projecting from the cylindrical surface, said spiral cutting edge being on the outer edge of said spiral ridge, and said outer edge being undercut.

3. Granulating apparatus for thermoplastics which comprises an extrusion device having a die plate with a plurality of extrusion orifices therein, said orifices being arranged in at least one horizontal straight line, a rotatable cutting tool opposite said line of orifices and having a horizontal axis of rotation, a spiral, outer, cutting edge on said tool contacting the outer face of said die plate at spaced points along said line of orifices, a housing covering said cutting tool and said outer face of said die plate, and means for flowing a cooling liquid through said housing.

4. Granulating apparatus as claimed in claim 3 and means to maintain said cooling liquid in said housing at a level wherein at least the lower portion of said cutting tool dips into said cooling liquid.

5. Apparatus as claimed in claim 4, said cutting tool comprising a rotatable cylinder having a spiral ridge projecting from the cylindrical surface, said spiral cutting edge being on the outer edge of said spiral ridge, and said outer edge being undercut, and drive means for rotating at a speed of rotation wherein the coolant liquid is conveyed in the open cavity of the undercut ridge over the cutting points in the die plate without interruption of the current of liquid.

6. Granulating apparatus as claimed in claim 1, said die plate having a plurality of parallel, straight lines of said orifices, and a plurality of said cutting tools in parallel arrangement with respective spiral cutting edges contacting the outer face of said die at spaced points along respective lines of orifices.

References Cited by the Examiner
UNITED STATES PATENTS

| | | | |
|---|---|---|---|
| 1,845,636 | 2/1932 | Walker | 146—61 |
| 2,011,128 | 8/1935 | Voorhis | 146—61 |
| 2,437,460 | 3/1948 | DeFrancisci. | |

WILIAM J. STEPHENSON, *Primary Examiner.*